(12) United States Patent
Pro et al.

(10) Patent No.: US 8,665,565 B2
(45) Date of Patent: Mar. 4, 2014

(54) TRACE JUMPERS FOR DISC DRIVE SUSPENSIONS

(71) Applicant: Hutchinson Technology Incorporated, Hutchinson, MN (US)

(72) Inventors: John D. Pro, Prior Lake, MN (US); Mark A. Miller, Darwin, MN (US); Michael E. Roen, Hutchinson, MN (US); Reed T. Hentges, Buffalo, MN (US); Gregory J. VanHecke, Dassel, MN (US)

(73) Assignee: Hutchinson Technology Incorporated, Hutchinson, MN (US)

(*) Notice: Subject to any disclaimer, the term of this patent is extended or adjusted under 35 U.S.C. 154(b) by 0 days.

(21) Appl. No.: 13/753,183

(22) Filed: Jan. 29, 2013

(65) Prior Publication Data

US 2013/0141821 A1 Jun. 6, 2013

Related U.S. Application Data

(62) Division of application No. 12/114,461, filed on May 2, 2008, now Pat. No. 8,379,349.

(60) Provisional application No. 60/916,201, filed on May 4, 2007.

(51) Int. Cl.
*G11B 21/21* (2006.01)
*G11B 5/48* (2006.01)

(52) U.S. Cl.
USPC .................................. 360/245.9; 360/246

(58) Field of Classification Search
USPC ............ 360/245.8, 245.9, 246, 234.4, 234.5, 360/234.6, 264.2, 266.3, 323
See application file for complete search history.

(56) References Cited

U.S. PATENT DOCUMENTS

| | | | | |
|---|---|---|---|---|
| 4,418,239 A | * | 11/1983 | Larson et al. | 174/34 |
| 6,075,676 A | * | 6/2000 | Hiraoka et al. | 360/264.2 |
| 6,282,062 B1 | * | 8/2001 | Shiraishi | 360/244.1 |
| 2002/0149888 A1 | * | 10/2002 | Motonishi et al. | 360/323 |
| 2003/0174445 A1 | * | 9/2003 | Luo | 360/245.9 |

* cited by examiner

*Primary Examiner* — Craig A. Renner
(74) *Attorney, Agent, or Firm* — Faegre Baker Daniels LLP

(57) ABSTRACT

Jumper constructions for an integrated lead flexure for a disk drive head suspension include a conductive base layer, an insulating layer over the base layer, a plurality of traces arranged on the insulating layer, and an isolated conductor layer arranged under the insulating layer. The plurality of traces include a first trace and a second trace and the isolated conductor layer is electrically isolated from the conductive base layer and electrically connects the first and second traces.

7 Claims, 8 Drawing Sheets

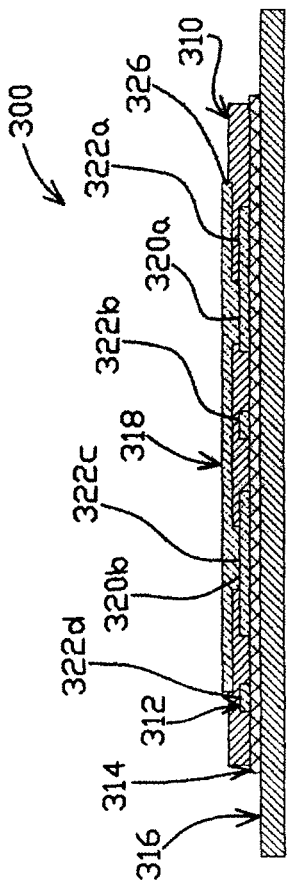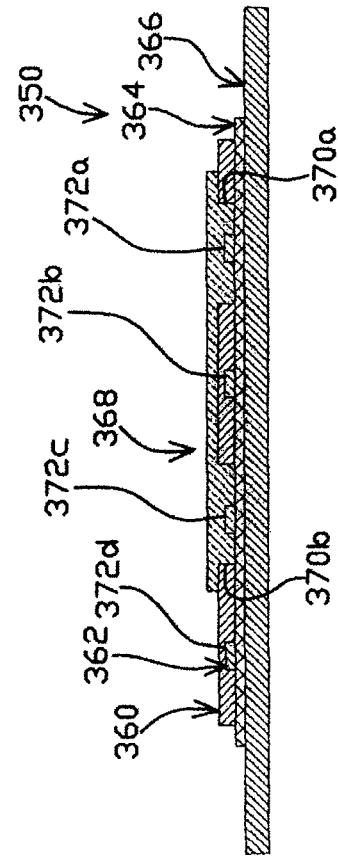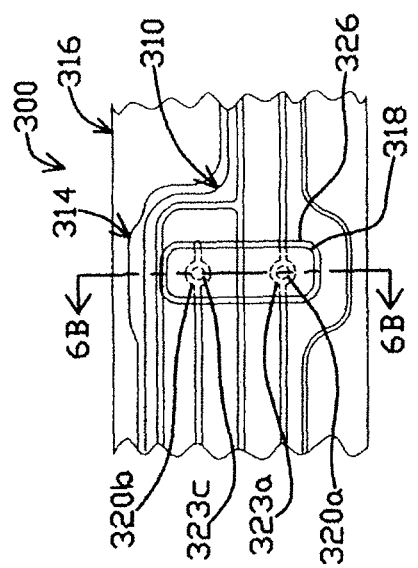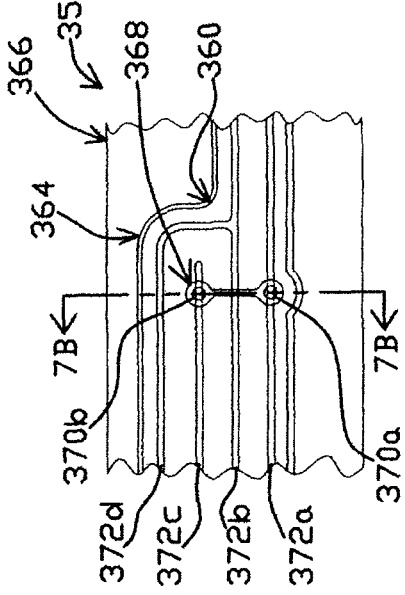
FIG. 6B
FIG. 7B
FIG. 6A
FIG. 7A

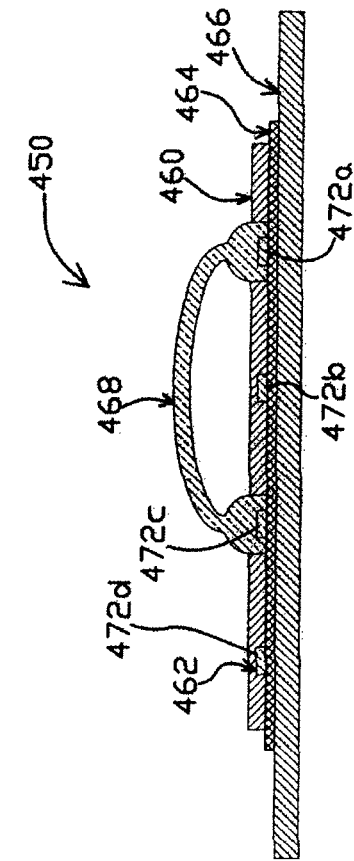
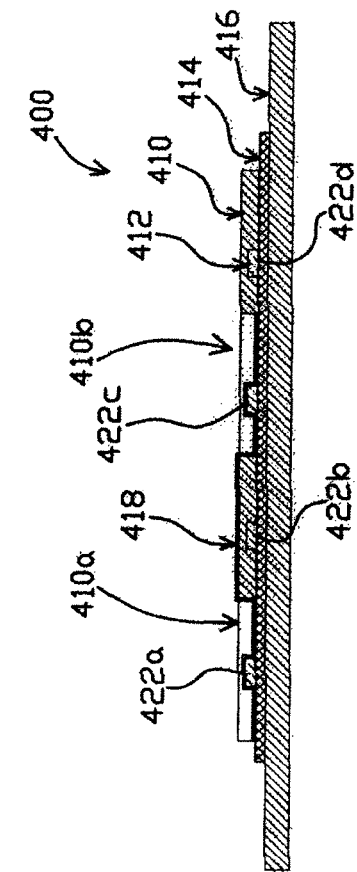
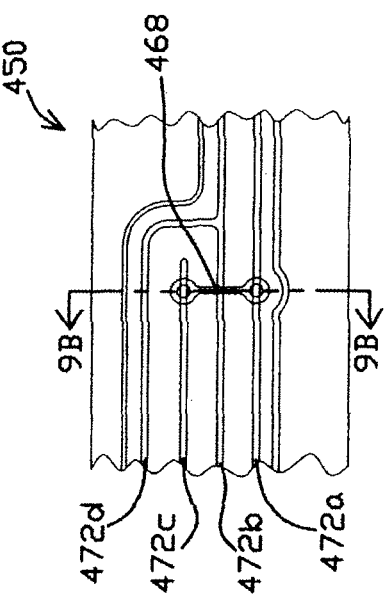
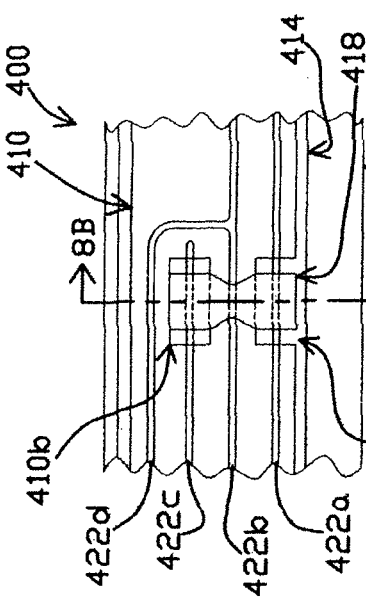

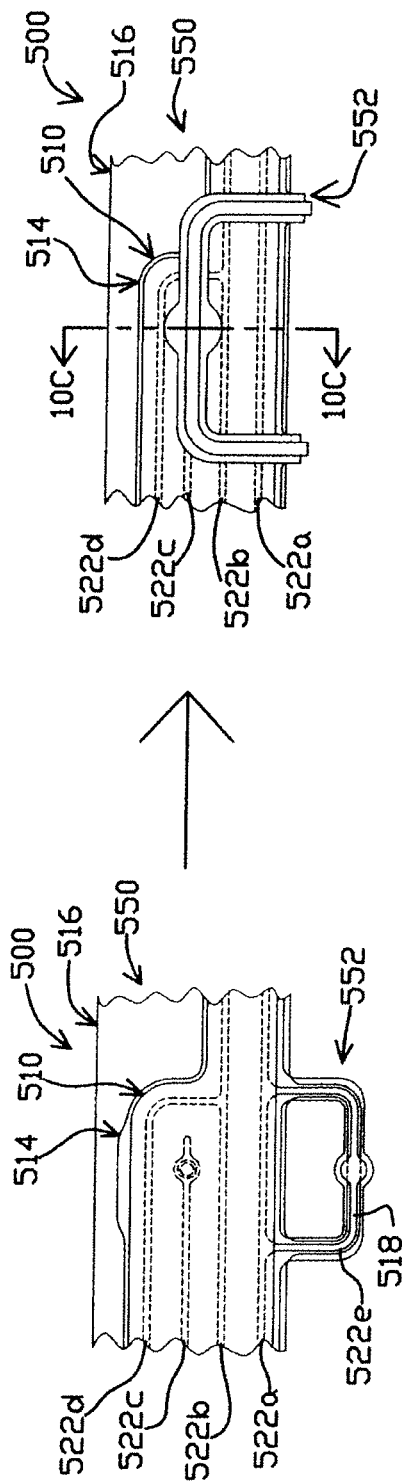
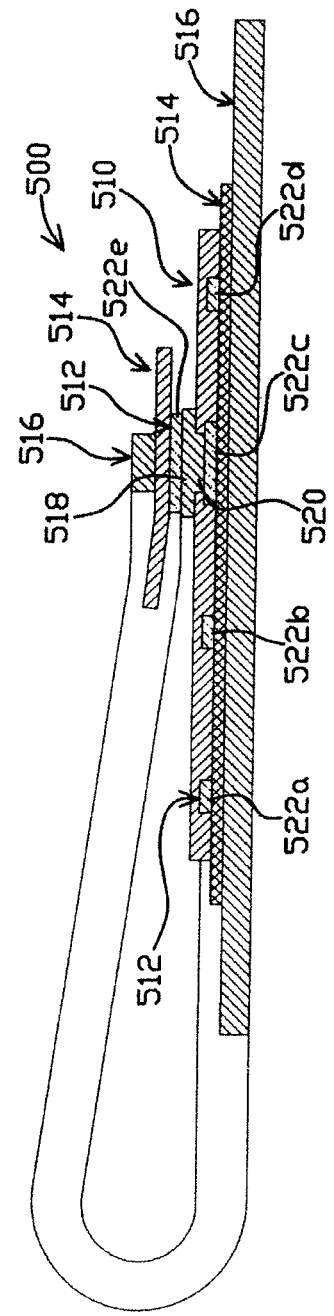
FIG. 10A
FIG. 10B
FIG. 10C

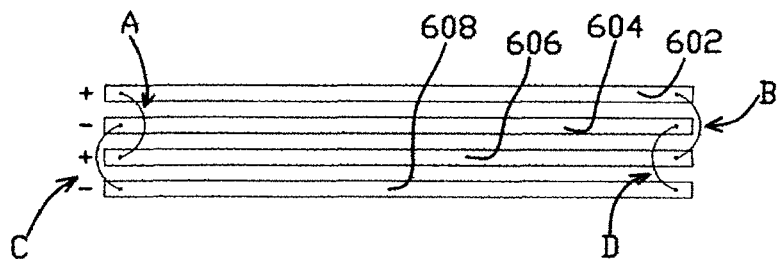
FIG. 11
FIG. 12
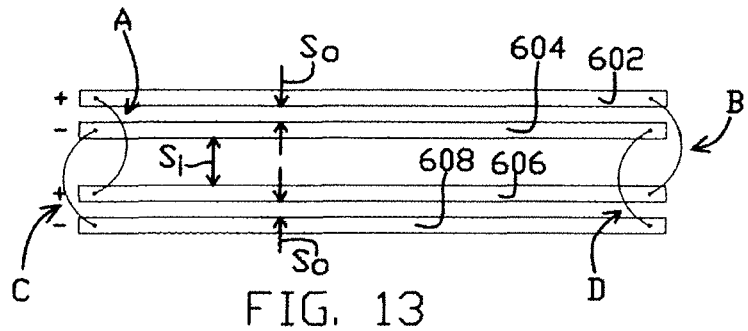
FIG. 13
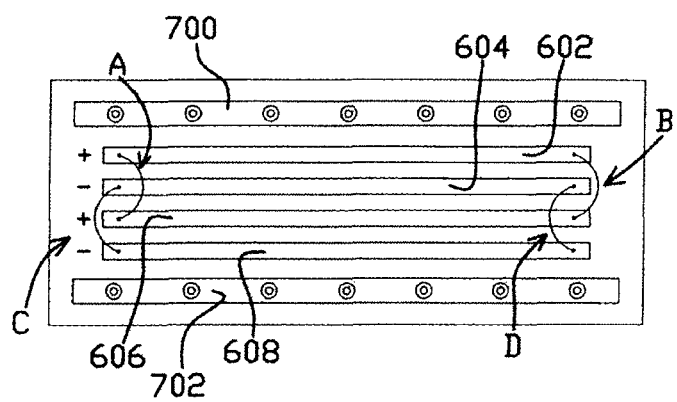 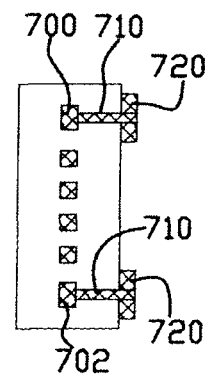
FIG. 14A   FIG. 14B

TRACE JUMPERS FOR DISC DRIVE SUSPENSIONS

CROSS-REFERENCE TO RELATED APPLICATIONS

This application is a division of Ser. No. 12/114,461 filed on May 2, 2008, and entitled TRACE JUMPERS FOR DISK DRIVE SUSPENSIONS, which claims the benefit of U.S. provisional patent application 60/916,201 filed on May 4, 2007, and entitled "TRACE JUMPERS FOR DISK DRIVE SUSPENSIONS," the entire contents of which are incorporated herein by reference and for all purposes.

TECHNICAL FIELD

The present invention relates generally to disk drive head suspensions. In particular, the invention is an integrated lead flexure for a suspension.

BACKGROUND

Disk drive head suspensions with wireless or integrated lead flexures are generally known and disclosed, for example, in the following U.S. Patents and U.S. Patent Application Publications, all of which are incorporated herein by reference.

| Inventor Name | Patent/Publication No. |
|---|---|
| Klaassen | 5,608,591 |
| Erpelding | 5,631,786 |
| Young | 5,717,547 |
| Balakrishnan | 5,737,152 |
| Balakrishnan | 5,995,328 |
| Balakrishnan et al. | 6,038,102 |
| Balakrishnan et al. | 6,275,358 |
| Shiraishi et al. | 6,839,204 |
| Kulangara et al. | 6,975,488 |
| Yang et al. | 2005/0280944 |

The continuing development of read/write head and related disk drive technology requires improved integrated lead flexures. Disk drive head suspensions with wireless or integrated lead flexures are generally known, though advances in low differential impedance and high bandwidth flexures remain to be realized.

SUMMARY

Various aspects of the present invention relate to trace jumper, trace, and associated flexure constructions, including those used to provide low differential impedances (e.g., <50 ohm) and high bandwidth (e.g., >3GHz), as well as efficient use and manufacture thereof. Still other aspects of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 6A and 6B are schematic and cross-sectional views showing another jumper construction for an integrated lead flexure in accordance with the present invention.

FIGS. 7A and 7B are schematic and cross-sectional views showing another jumper construction for an integrated lead flexure in accordance with the present invention.

FIGS. 8A and 8B are schematic and cross-sectional views showing another jumper construction for an integrated lead flexure in accordance with the present invention.

FIGS. 9A and 9B are schematic and cross-sectional views showing another jumper construction for an integrated lead flexure in accordance with the present invention.

FIGS. 10A-10C are schematic and cross-sectional views showing another jumper construction for an integrated lead flexure in accordance with the present invention.

FIGS. 11-16 are schematic views of various interleaved trace designs that can be interconnected using the jumper constructions of the present invention.

Figure 1:
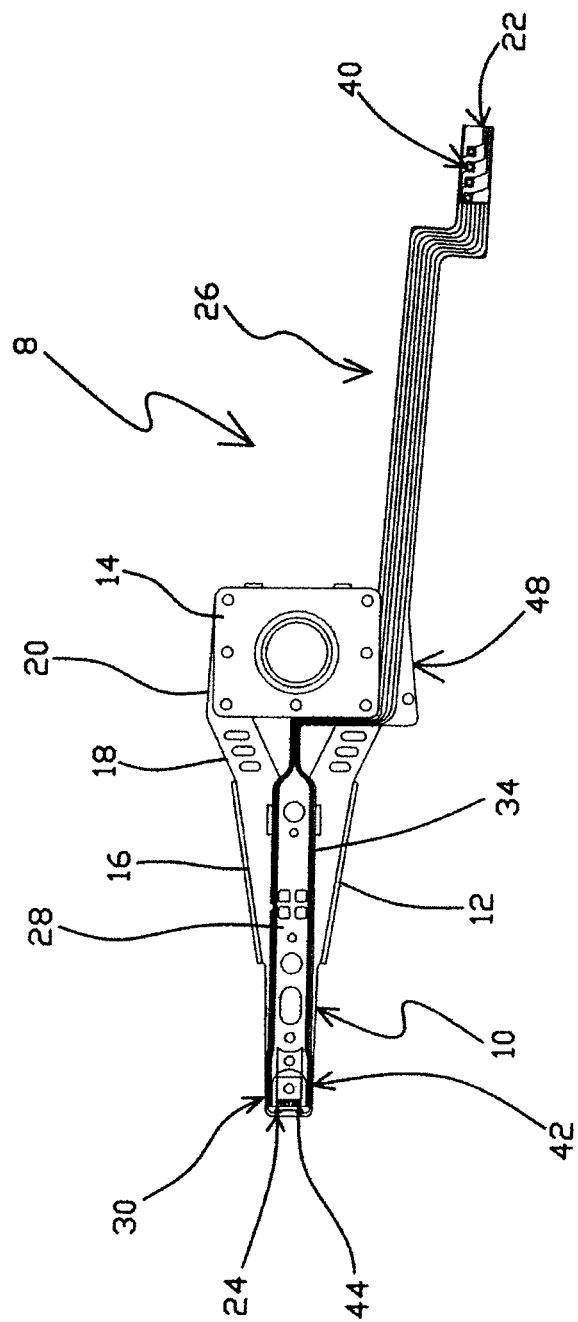
FIG. 1 shows a disk drive head suspension having an integrated lead flexure in accordance with the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 shows a disk drive head suspension 8 including an integrated lead flexure 10 in accordance with one embodiment of the present invention. The integrated lead flexure 10 includes one or more jumper assemblies, such as one of the jumper assemblies shown in FIGS. 2A-10C, which are described in greater detail below.

The suspension 8 is a three-piece assembly in the illustrated embodiment, and includes a load beam 12 and base plate 14 in addition to the flexure 10, although other configurations are also contemplated. Load beam 12, which is typically formed from stainless steel, includes a beam region 16, a hinge region 18 and a mounting region 20. The base plate 14 is welded to the mounting region 20 at the proximal end of the load beam 12.

The flexure 10 is an integrated lead, or wireless flexure and has a proximal end 22 and a distal end 24. The illustrated embodiment of the flexure 10 has a tail region 26 extending from the proximal end 22, a mounting or base region 28 that is welded or otherwise attached to the beam region 16 of the load beam 12, and a gimbal region 30 extending distally from the base region 28. The flexure 10 includes one or more insulating layers of dielectric material and one or more integrated transmission line arrays 34 along the flexure 10.

The proximal end of the tail region 26 includes a plurality of terminal connector pads 40 adapted for connection to electronics in the disk drive in which the suspension 8 is incorporated. The gimbal region 30 includes a slider mounting region 42 for mounting a head slider having a transducer head (not shown). The slider mounting region 42 includes a plurality of head connector pads 44. In general terms, the plurality of head connector pads 44 are bond pads for providing an electrical connection to the transducer head.

Base region 28, and portions of the gimbal region 30 are formed from a spring metal base layer 48. Stainless steel is commonly used for the base layer 48 in applications of this type. Portions of the electrical structures, including the connector pads 40, 44 and the integrated transmission line arrays 34 that overlay the base layer 48 are spaced and electrically insulated from the base layer 48 by one or more insulating layers of the flexure 10, as will be subsequently described in greater detail. For reference, polyimide is one acceptable dielectric material for providing electrical insulation in applications of this type, although a variety of dielectric materials can be employed as desired.

The integrated transmission line arrays 34 are each formed by traces which can be arranged in a planar configuration, as part of a common layer, or a non-planar configuration, being vertically broadside coupled over multiple layers, as desired. In some embodiments, one or more of the integrated transmission line arrays 34 include a plurality of traces, for example write traces, forming a transmission pathway from the terminal connector pads 40 to the head connector pads 44 and another plurality of traces, for example read traces, traversing another transmission pathway from the terminal connector pads 40 to the head connector pads 44.

In some embodiments, the traces of one or more first integrated transmission line arrays 34 have an interleaved configuration, also referred to as a multi-trace configuration, for example, which include a first set of electrically connected signal conductor traces having a first polarity that alternate, or are interleaved with one or more electrically connected conductor traces having a second polarity. A variety of interleaved and non-interleaved trace configurations are contemplated, including three trace, four trace, or six trace configurations, for example, and as described in greater detail below.

Examples of some suitable interleaved trace configurations, also referred to as multi-trace trace configurations, for example, can be found in U.S. Pat. No. 5,717,547 to Young, issued Feb. 10, 1998, the contents of which is incorporated herein by reference. Additional examples of suitable interleaved trace configurations that can be interconnected using one or more jumper constructions described in greater detail below with reference to FIGS. 11-13.

FIGS. 2A-10B show various jumper constructions in accordance with embodiments of the present invention. In general terms, the various embodiment jumper constructions are adapted to electrically connect two or more traces of the integrated transmission line arrays 34. One or more of the jumper constructions can be located anywhere along the flexure 10. In some embodiments, the jumper constructions are located proximate one of the terminal connector pads 40 and/or the head connector pads 44, for example, to facilitate the use of an interleaved trace configuration with the flexure 10.

The traces to be connected by the jumper constructions can be part of a four-trace, coplanar, and interleaved trace configuration as illustrated in FIGS. 2A-10B, although a variety of configurations are contemplated. Additionally, although coplanar configurations are illustrated, various embodiments additionally or alternatively include broadside coupled trace arrays, with similar principles applying to the broadside coupled arrays as those described in reference to coplanar trace arrays.

The various embodiment jumper constructions can be manufactured using known additive and/or subtractive processes. In some embodiments, the flexure 10, including the jumper constructions, is manufactured from a laminated sheet using subtractive processes. Conventional or otherwise known photolithography and etching processes can be used for this purpose. Additive processes are used in other embodiments. Conventional or otherwise known deposition techniques (e.g., electroplating, sputtering, photolithography, and etching processes) can be used for this purpose. In some embodiments, the various types of interconnects between layers are formed using via plating methods, such as the methods for forming electrical interconnects described in copending application Ser. No. 11/535,712, "Plated Ground Features for Integrated Lead Suspensions," filed Sep. 27, 2006, the contents of which are incorporated herein by reference. Where applicable, solder deposition, adhesive deposition and/or wirebonding according to known techniques are also applicable according to some embodiments.

Figure 2B:
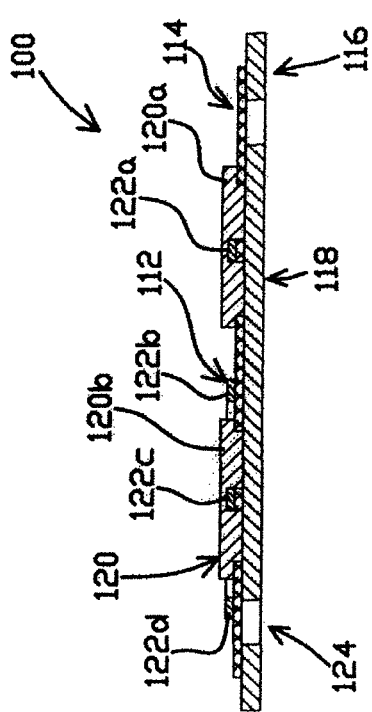
FIGS. 2A and 2B are schematic and cross-sectional views showing one jumper construction for an integrated lead flexure in accordance with the present invention.
Figure 2A:
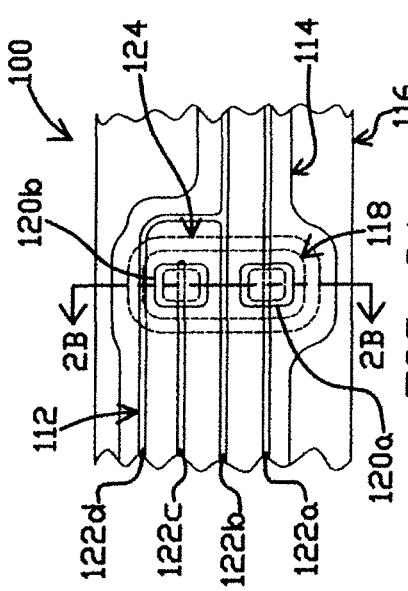

FIGS. 2A and 2B show a jumper construction 100 according to one embodiment of the invention. FIG. 2A is a top view of the jumper construction 100 showing the boundaries of various features, including those disposed on different layers (with those otherwise hidden from view in broken lines). FIG. 2B shows a cross-section taken along line 2B-2B of FIG. 2A. The jumper construction 100 includes a trace layer 112, an insulating layer 114, a base layer 116, an isolated conductor layer 118 (also described as an conductive island 118) and a plurality of interconnects 120.

The trace layer 112 includes a plurality of traces 122a-122d of the one or more integrated transmission line arrays 34. The plurality of traces 122a-122d are of a four-trace, coplanar, and interleaved configuration in the illustrated embodiment, although other embodiments include other trace configurations. As shown, the plurality of traces 122a-122d include a first trace 122a, a second trace 122b, a third trace 122c, and a fourth trace 122d. As will be described in greater detail, the first and third traces 122a, 122c are electrically joined through the isolated conductor layer 118 while the second and fourth traces 122b, 122d are electrically joined within the trace layer 112.

The insulating layer 114 is formed of a dielectric material, polyimide, for example, and generally separates and electrically isolates portions of the trace layer 112 from the base layer 116.

The base layer 116 is conductive and is a portion of the spring metal base layer 48 in some embodiments, although the base layer 116 can be formed separately from the spring metal base layer 48. The base layer 116 has a pocket 124 (also described as a gap 124) in the base layer 116. As shown, the pocket 124 extends about the isolated conductor layer 118. The pocket 124 is formed under the traces to be electrically connected (in the illustration of FIGS. 3A and 3B, the first and third traces 172a, 172c are electrically connected in the jumper construction 150) and is substantially rectangular with rounded corners, although other shapes, including those optimizing mechanical and/or electrical performance of the flexure 10 are also contemplated.

The isolated conductor layer 118 is located in the pocket 124 formed within the base layer 116 and is electrically isolated from the base layer 116. In some embodiments, the isolated conductor layer 118 is formed from a portion of the base layer 116 that is separate from the base layer material surrounding the pocket 124. The isolated conductor layer 118 is formed, for example, using known additive or subtractive methods. In some embodiments, the isolated conductor layer 118 is formed by etching base layer material from around the isolated conductor layer 118 to electrically isolate the two layers 116, 118.

The plurality of interconnects 120a, 120b include a first interconnect 120a and a second interconnect 120b. The first and second interconnects 120a, 120b, in combination with the isolated conductor layer 118, form a jumper connection between the first and third traces 122a, 122c. In particular, the first interconnect 120a forms an electrical connection between the first trace 122a and the isolated conductor layer 118 while the second interconnect 120b forms an electrical connection between the third trace 122c and the isolated conductor layer 118. In some embodiments, the first and second interconnects 120a, 120b are plated-via structures extending through the insulating layer 114, although other types of interconnects are contemplated as described subsequently in great detail.

Figure 3B:
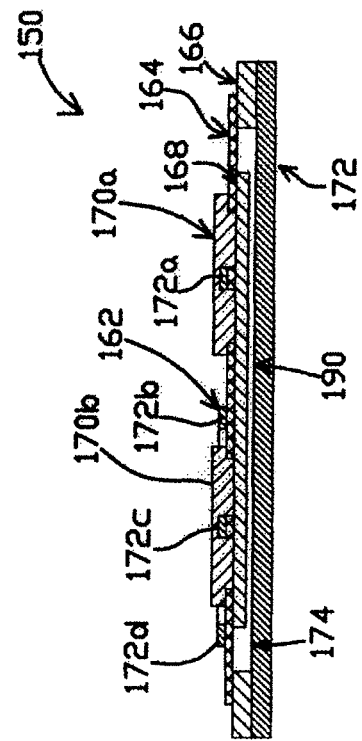
FIGS. 3A and 3B are schematic and cross-sectional views showing another jumper construction for an integrated lead flexure in accordance with the present invention.
Figure 3A:
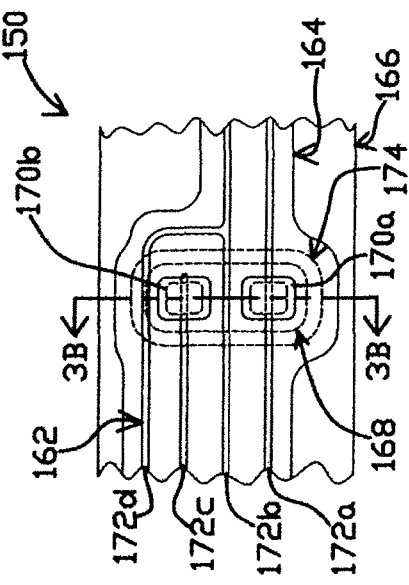

FIGS. 3A and 3B show another jumper construction 150 of the flexure 10. FIG. 3A is a top view of the jumper construction 150 showing the boundaries of various features, including those on different layers (which might otherwise be hidden from view), in solid lines. FIG. 3B shows a cross-section taken along line 3B-3B of FIG. 3A. The jumper construction 150 includes a trace layer 162, an insulating layer 164, a base layer 166 having a pocket 174 (also described as a gap 174), an isolated conductor layer 168 (also described as a conductive island 168), a plurality of interconnects 170a, 170b including first and second interconnects 170a, 170b, and a backing layer 172, which is optionally a portion of the load beam 12 (FIG. 1). The trace layer 162 includes first, second, third and fourth traces 172a, 172b, 172c, 172d, respectively. The first and third traces 172a, 172d are electrically connected through the interconnects 170a, 170b and the isolated conductor layer 168.

As shown in FIG. 3B, the isolated conductor layer 168 is substantially thinner than the base layer 166, thereby forming a gap 190 under the isolated conductor layer 168 relative to the base layer 166. In some embodiments, the thickness of the isolated conductor layer 168 is reduced by partially etching the isolated conductor layer 168, although other methods of formation can be equally acceptable. The backing layer 172 backs the base layer 166, but is electrically isolated from the isolated conductor layer 168 due to the gap 190 between the isolated conductor layer 168 and the backing layer 172.

Figure 4A:
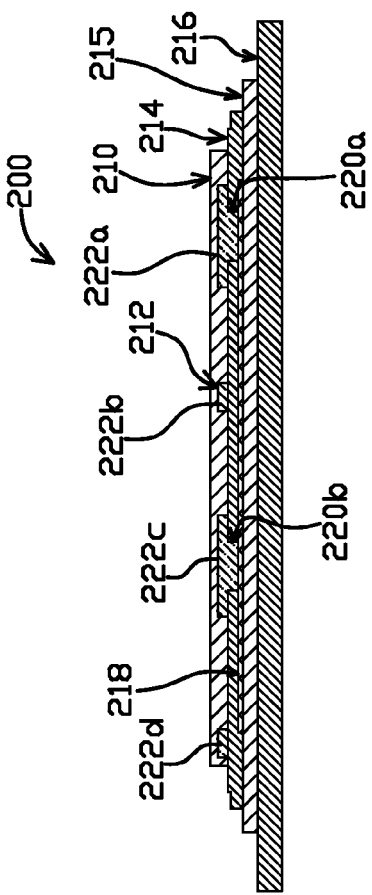
FIGS. 4A and 4B are schematic and cross-sectional views showing another jumper construction for an integrated lead flexure in accordance with the present invention.
Figure 4B:
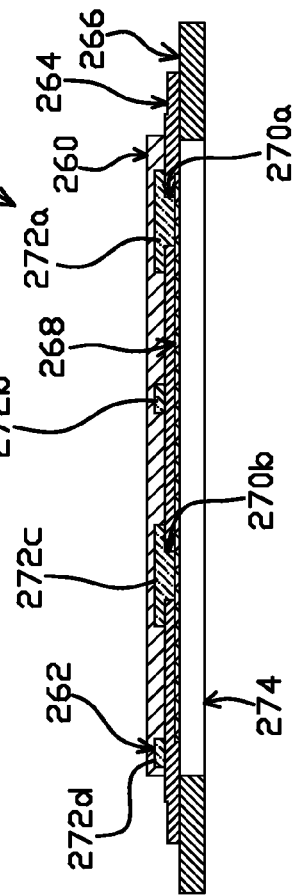

FIG. 4A is a top view of another jumper construction 200 showing the boundaries of various features, including those residing on different layers (with those otherwise hidden from view in broken lines). FIG. 4B shows a cross-section taken along line 4B-4B of FIG. 4A. The jumper construction 200 includes a cover coat 210, a trace layer 212, a first insulating layer 214, a second insulating layer 215, a base layer 216, an isolated conductor layer 218 (also described as a conductive island 218), and a plurality of interconnects 220a, 220b. The jumper construction 200 also optionally includes a backing layer (not shown), which can be similar to those previously described.

The cover coat 210 is a protective layer adapted to electrically insulate the trace layer 212 and/or protect the trace layer 212 from mechanical damage. The cover coat 210 can be made of a variety of materials, including ones known to those of skill in the art.

The trace layer 212 includes a first trace 222a, a second trace 222b, a third trace 222c, and a fourth trace 222d. The first and third traces 222a, 222c are electrically joined through the isolated conductor layer 218 while the second and fourth traces 222b, 222d are electrically joined within the trace layer 212. As shown, the first and third traces 222a, 222c each form wider, circular portions 223a, 223c that correspond in position to the plurality of interconnects 220a, 220b.

The first and second insulating layers 214, 215 are formed of dielectric materials such as those previously described. The first insulating layer 214 separates and electrically isolates portions of the trace layer 212 from the isolated conductor layer 218. The second insulating layer 215 separates and electrically isolates portions of the isolated conductor layer 218 from the base layer 216.

Similarly to other embodiments, the base layer 216 is a portion of the spring metal base layer 48, although the base layer 216 can be formed of different materials than the spring metal base layer 48 according to some embodiments.

The isolated conductor layer 218 includes a conductive material and is arranged between the first and second insulating layers 214, 215, which electrically isolates the conductor layer 218 from the base layer 216 and the trace layer 212.

The plurality of interconnects 220 include a first interconnect 220a and a second interconnect 220b that are optionally substantially similar to those previously described. The first interconnect 220a forms an electrical connection between the first trace 222a and the isolated conductor layer 218 while the second interconnect 220b forms an electrical connection between the third trace 222c and the isolated conductor layer 218.

Figure 5A:
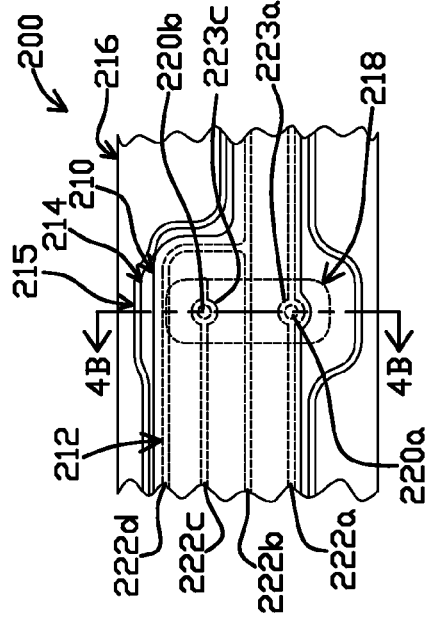
FIGS. 5A and 5B are schematic and cross-sectional views showing another construction for an integrated lead flexure in accordance with the present invention.
Figure 5B:
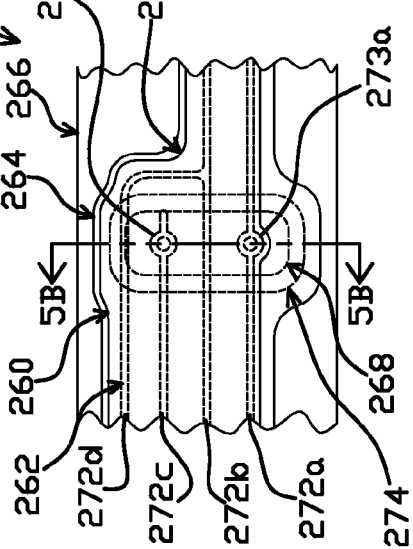

FIG. 5A is a top view of another jumper construction 250 showing the boundaries of various features, including those residing on different layers (with those otherwise obscured from view in broken lines). FIG. 5B shows a cross-section taken along line 5B-5B of FIG. 5A. The jumper construction 250 includes a cover coat 260, a trace layer 262, an insulating layer 264, a base layer 266, an isolated conductor layer 268 (also described as a conductive island 268), and a plurality of interconnects 270a, 270b. The jumper construction 250 also optionally includes a backing layer (not shown), which can be similar to those previously described.

The cover coat 260 and trace layer 262 are optionally similar to those described in association with other embodiments, with the trace layer 262 including, for example, a first trace 272a, a second trace 272b, a third trace 272c, and a fourth trace 272d. In some embodiments, the first and third traces 272a, 272c form wider circular portions 273a, 273c that correspond to the plurality of interconnects 270a, 270b.

Similarly to other embodiments, the first insulating layer 264 is formed of a dielectric material and separates the trace layer 262 and the isolated conductor layer 268. The base layer 266 is a portion of the spring metal base layer 48, although other configurations are contemplated as described in association with other embodiments. The base layer 266 has a pocket 274 formed under the isolated conductor layer 268 such that the isolated conductor layer 268 is electrically isolated from the base layer 266. As shown, the pocket 274 has a substantially larger outer perimeter than the isolated conductor layer 268.

The isolated conductor layer 268 is substantially thinner than the base layer 266 and, in some embodiments, is formed of plated copper. As shown, the pocket 274 forms a gap under the isolated copper layer 268. If desired, a backing layer (not shown), such as those previously described (e.g., backing layer 172), backs the base layer 266, but is electrically isolated from the isolated conductor layer 268 due to the gap provided by the pocket 274.

The plurality of interconnects 270a, 270b are similar to those previously described, with the interconnects 270a, 270b including a first interconnect 270a and a second interconnect 270b, which, in combination with the isolated conductor layer 268, form a jumper connection between the first and third traces 272a, 272c. In particular, the first interconnect 270a forms an electrical connection between the first trace 272a and the isolated conductor layer 268 while the second interconnect 270b forms an electrical connection between the third 272c and the isolated conductor layer 268.

FIGS. 6A and 6B show another jumper construction 300 of the flexure 10. FIG. 6A is a top view of the jumper construction 300 showing the boundaries of various features, including those residing on different layers (with those otherwise obscured from view in broken lines). FIG. 6B shows a cross-section taken along line 6B-6B of FIG. 6A. The jumper construction 300 includes a cover coat 310, a trace layer 312, an insulating layer 314, a base layer 316, an isolated conductor layer 318 (also described as a conductive island 318), and a plurality of interconnects 320a, 320b. The jumper construction also optionally includes a backing layer (not shown), such as those previously described.

The trace layer 312, base layer 316, and insulating layer 314 are optionally similar to those of other embodiments. In some embodiments, the trace layer 312 includes a first trace 322a, a second trace 322b, a third trace 322c, and a fourth trace 322d with the first and third traces 322a, 322c forming wider circular portions 323a, 323c.

As shown, the isolated conductor layer 318 is formed over the cover coat 310 and the plurality of interconnects 320a, 320b are formed through the cover coat 310. The isolated conductor layer 318 is generally formed of a conductive material arranged over the cover coat 310. In some embodiments, the cover coat 310 has a pocket 326 formed partially into the thickness of the cover coat 310 and adapted to receive the isolated conductor layer 318. The pocket 326 is optionally formed via a partial etch of the cover coat 310, although other methods of formation can also be acceptable. In other embodiments, the pocket 326 is omitted, with the isolated conductor layer 318 being arranged on top of the cover coat 310 as desired.

The isolated conductor layer 318 is optionally any of a variety of conductive materials, including copper, nickel, gold, conductive adhesives, conductive inks, or others. The pocket 326 can help retain the material comprising the isolated conductor layer 318 in a desired shape, such as the rectangular shape with rounded corners shown in FIG. 6A. For example, in some embodiments, the isolated conductor layer 318 is solder that has been deposited in pocket 326 to form a conductive pad of solder, or a "solder lake."

Similarly to other embodiments, the interconnects 320a, 320b, in combination with the isolated conductor layer 318, form a jumper connection between the first and third traces 322a, 322c. In particular, the plurality of interconnects 320a, 320b, including first and second interconnects 320a, 320b, are formed of a conductive material, such as those previously described. In some embodiments, the first and second interconnects 320a, 320b are conductive via-structures extending through the cover coat 310. For example, in some embodiments holes extending through the cover coat 310 are filled with conductive material as the isolated conductor layer 318 is formed on the cover coat 310, thereby forming the interconnects 320a, 320b.

FIGS. 7A and 7B show another jumper construction 350 of the flexure 10. FIG. 7A is a top view of the jumper construction 350 showing the boundaries of various features, including those residing on different layers (with those otherwise obscured from view shown in broken lines). FIG. 7B shows a cross-section taken along line 7B-7B of FIG. 7A. The jumper construction 350 includes a cover coat 360, a trace layer 362, an insulating layer 364, a base layer 366, an isolated conductor layer 368 (also described as a conductive island 368), and a plurality of interconnects 370a, 370b. The jumper construction 350 also optionally includes a backing layer (not shown), such as those previously described.

The trace layer 362, base layer 366, and insulating layer 364 are optionally similar to those of other embodiments. In some embodiments, the trace layer 362 includes a first trace 372a, a second trace 372b, a third trace 372c, and a fourth trace 372d.

As shown, the isolated conductor layer 368 is formed over the cover coat 360 and the plurality of interconnects 370a, 370b are formed through the cover coat 360. The isolated conductor layer 368 is optionally substantially dumbbell-shaped from a plan view as shown. In some embodiments, the isolated conductor layer 368 and the interconnects 370a, 370b are formed by depositing a conductive material, including copper, for example, over the cover coat 360 to form the isolated conductor layer 368 and through the cover coat 360 to form first and second interconnects 370a, 370b. Similarly to other embodiments, the interconnects 370a, 370b, in combination with the isolated conductor layer 368, form a jumper connection between the first and third traces 372a, 372c.

FIGS. 8A and 8B show another jumper construction 400 of the flexure 10. FIG. 8A is a top view of the jumper construction 400 showing the boundaries of various features, including those residing on different layers (with those otherwise obscured from view shown in broken lines). FIG. 8B shows a cross-section taken along line 8B-8B of FIG. 8A. The jumper construction 400 includes a cover coat 410, a trace layer 412, an insulating layer 414, a base layer 416, and an isolated conductor layer 418 (also described as a conductive island 418). The jumper construction 400 also optionally includes a backing layer (not shown), such as those previously described.

The trace layer 412, base layer 416, and insulating layer 414 are optionally similar to those of other embodiments. In some embodiments, the trace layer 412 includes a first trace 422a, a second trace 422b, a third trace 422c, and a fourth trace 422d.

As shown, the cover coat 410 has two pockets 410a, 410b extending into the thickness of the cover coat 410. In some embodiments, the pockets 410a, 410b extend down to the insulating layer 414 as shown, exposing the first and third traces 422a, 422c down to the insulating layer 414. In other embodiments, the pockets 410a, 410b extend down to the trace layer 412 to expose portions of the first and third traces 422a, 422c with some of the cover coat 410 remaining over the insulating layer 414 in the pockets 410a, 410b.

The isolated conductor layer 418 forms a jumper connection between the first and third traces 422a, 422c. As shown, the isolated conductor layer 418 includes a conductive material and is arranged within the pockets 410a, 410b to contact the first and third traces 422a, 422c and extends over the cover coat 410 to remain electrically isolated from the second and third traces 422b, 422d. The isolated conductor layer 418 optionally includes any of a variety of conductive materials, such as silver, copper, nickel, gold, conductive adhesives, silver ink, and/or others. The isolated conductor layer 418 optionally has an hourglass shape, although a variety of shapes are acceptable. In some embodiments, the isolated conductor layer 418 is formed using sputtering and plating techniques, although a variety of methods can be used as desired.

FIGS. 9A and 9B show another jumper construction 450 of the flexure 10. FIG. 9A is a top view of the jumper construction 450 showing the boundaries of various features (showing those residing on different layers which would otherwise be obscured from view in broken lines). FIG. 9B is plan view of a cross-section taken along line 9B-9B of FIG. 9A. The jumper construction 450 includes a cover coat 460, a trace layer 462, an insulating layer 464, a base layer 466, and an isolated conductor 468.

The cover coat 460, trace layer 462, insulating layer 464, and base layer 466 are optionally similar to those of other embodiments. In some embodiments, the trace layer 462 includes a first trace 472a, a second trace 472b, a third trace 472c, and a fourth trace 472d. The cover coat 460 optionally has holes or other features exposing portions of the first and third traces 472a, 472c.

The isolated conductor 468 forms a jumper connection between the first and third traces 472a, 472c. The isolated conductor 418 is optionally a wire of conductive material secured to the first and third traces 472a, 472c, for example using wire bonding techniques. In some embodiments, the isolated conductor 468 is a gold wire.

FIGS. 10A, 10B, and 10C show another jumper construction 500 of the flexure 10. FIG. 10A is a top view of the jumper construction 500 in an open state showing the boundaries of various features (where those residing on different layers that would otherwise be obscured from view are shown in broken lines). FIG. 10B is a top view of the jumper construction 500 in a closed state. FIG. 10C shows a cross-section taken along line 10C-10C of FIG. 10B.

The jumper construction 500 includes a cover coat 510, a trace layer 512, an insulating layer 514, a base layer 516, an isolated conductor layer 518 (also described as a conductive island 518) that is part of the trace layer 512, and an interconnect 520. The jumper construction 500 also optionally includes a backing layer (now shown), such as those previously described. The jumper construction 500 includes a main portion 550 and a formable portion 552 extending from the main portion 550. The main and formable portions 550, 552 are manufactured substantially concurrently, although separate components that are later connected are also contemplated.

The main and formable portions 550, 552 are both constructed of the base portion 516, the insulating layer 514, and the trace layer 512. The trace layer 512 forms a plurality of traces 522 over the main portion 550, such as a first trace 522a, a second trace 522b, a third trace 522c, and a fourth trace 522d. The trace layer 512 also forms a fifth trace 522e over the formable portion 552, where the fifth trace 522e is electrically connected to the first trace 522a and performs as the isolated conductor layer 518.

The cover coat 510 is formed over the main portion 550, electrically insulating and/or mechanically protecting portions of the trace layer 512 on the main portion 550. In some embodiments, the cover coat 510 is formed with a portion of the third trace 522c exposed. The interconnect 520 is formed over the exposed portion of the third trace 522c according to any of a variety of techniques, including those previously described. Additionally or alternatively, the interconnect 520 is optionally formed on the fifth trace 520e.

The jumper construction 500 is adapted to be transitioned from the open state (FIG. 10A) where the formable portion 552 extends laterally from the main portion 550 to the closed state (FIG. 10B) where the formable portion is positioned over the main portion 552. The jumper construction 500 can be transitioned from the open state to the closed state using a forming process that includes bending the formable portion 552 onto the main portion 550. In particular, the formable portion 552 includes structures and materials suited for bending in the manner generally represented in FIGS. 10A-10C without failure.

Upon bending the formable portion 552 onto the main portion 550 the fifth trace 522e, alternatively described as the isolated conductor layer 518, is brought into electrical communication with the first trace 522a through the interconnect 520, thereby placing the third trace 522c in electrical communication with the first trace 522a through the fifth trace 522e and the interconnect 520. The formable portion 552 is optionally secured in the closed position using adhesives, soldering, ultrasonic welding or other mechanisms as desired. For example, the interconnect 520 is optionally formed of a conductive adhesive acting to provide an electrical pathway as well as to secure the formable portion 552 to the main portion 550 in the closed position.

The foregoing provides various embodiment jumper constructions for use with integrated lead flexures of disk drive head suspensions. The jumper constructions are optionally used with any portion of such suspensions or any disk drive components. In general terms, interleaved coplanar coupled trace arrangements can be used throughout the flexure 10 to provide low differential impedance and high bandwidth signals. In other embodiments, the interleaved portion of a set of interleaved traces only extends for a portion of the suspension, e.g., only the tail region and between the LB radius and gimbal regions.

FIGS. 11-13 are schematic views of various interleaved trace designs which use one or more of the jumper constructions 100, 150, 200, 250, 300, 350, 400, 450, 500 for one or more of connections A, B, C, and/or D as indicated on those figures. Though FIGS. 11-13 show four-trace interleaved coplanar traces, any number of traces are contemplated. Additionally, the jumper constructions connecting traces can be located proximate the terminal connector pads 40 (FIG. 1), proximate the head connector pads 44 (FIG. 1), or located as desired. For example, in some embodiments, one or more jumper constructions used in association with an interleaved trace array are located proximal the gimbal region 30 (FIG. 1), with the interleaved trace array transitioning from a first number of interleaved traces that extend to the gimbal region 30, four, for example, to a second, fewer number of traces extending over the gimbal region 30, two, for example. In some embodiments, the number of interleaved traces reduces to two traces at the head connector pads 44, for example using one of the embodiment jumper constructions, with the total, unreduced number of interleaved traces running back from the head connector pads 44 off the tail region 26 without otherwise being reduced at the tail region 26.

FIGS. 11-14 show various configurations of traces 602, 604, 606, 608 that are optionally employed for the transmission line arrays 34. The traces 602, 604, 606, 608 have alternating polarities, where the traces 602, 606 are electrically coupled at A and B while traces 604, 608 are electrically coupled at C and D and where A, B, C, and/or D optionally employ any of the jumper configurations previously described.

In some embodiments, use of alternating polarities between coupled trace pairs gives rise to more sidewall currents, which lead to reduced differential impedance without sacrificing higher bandwidths that associated with a single pair of coupled trace pairs used to transmit signals. Using one or more of the jumper structures previously described, the traces can be electrically connected to one another on the suspension or off the suspension at other locations in the disk drive electronic circuitry.

Use of interleaved traces according to embodiments of the invention can offer a number of important features and advantages. For example, it can help retain a three-layer laminate or structure of stainless steel, polyimide and copper, while achieving very low differential impedances at very high bandwidths. Use of the three-layer structure helps avoid adding stiffness beyond that of polyimide with a single copper trace layer (as can otherwise be encountered in broadside coupled trace approaches). Traces can be routed in areas sensitive to footprint limitations (e.g., weld and loadbeam regions) and areas sensitive to stiffness (e.g., the gimbal and radius regions). Various embodiment traces, jumpers, and associated structures are also able to be implemented using known subtractive (e.g., TSA) and additive (e.g., TSA+) manufacturing processes.

FIG. 11 schematically shows one embodiment interleaved trace configuration with traces 602, 604, 606, 608 having alternating polarities. The traces 602, 606 are electrically coupled at A and B while traces 604, 608 are electrically coupled at C and D where A, B, C, and/or D optionally employ any of the jumper configurations previously described.

FIG. 12 schematically shows one embodiment interleaved trace configuration where the inner traces 604, 606 have a relatively greater width than the outer traces 602, 608. For example, the inner traces 604, 606 have a width three times greater than a width of the outer traces 602, 608. In some embodiments, the interleaved trace configuration illustrated in FIG. 11 is used to help balance or otherwise reduce the effect of electrical transmission delays in the traces.

FIG. 13 schematically shows another embodiment interleaved trace configuration where the spacing between the inner traces 604, 606 is relatively greater than the spacing between the outer traces 602, 608. For example, the inner trace-to-trace spacing (Si) can be three times greater than the outer trace-to-trace spacing (So). In some embodiments, the interleaved trace configuration illustrated in FIG. 13 is used to help balance or otherwise reduce the effect of electrical transmission delays in the trace array.

FIGS. 14A and 14B schematically show still another embodiment interleaved trace configuration including a ground fence where a pair of ground traces 700, 702 through connections 710 grounded to a conductive base layer 720, such as base layer 48, for example. In some embodiments the ground fence is added to an interleaved array of traces to reduce differential impedance and external coupling of the interleaved array.

Figure 15:
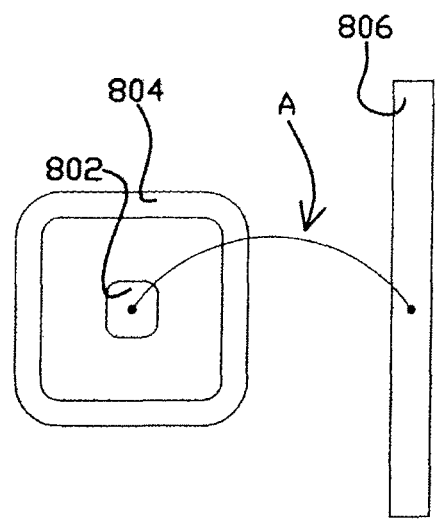

FIG. 15 schematically shows yet another embodiment interleaved trace configuration where the interleaved traces include a first trace 804 that is a complete loop and a second set of traces 802, 806 of a different polarity including an inside trace 802 in the center of the first trace loop 804 and an outside trace 806 outside the first trace loop 804. The inside and outside traces 802, 806 would be jumped to one another as designated by "A" using one or more embodiment jumper constructions previously described or are connected using secondary traces on each end.

Figure 16:
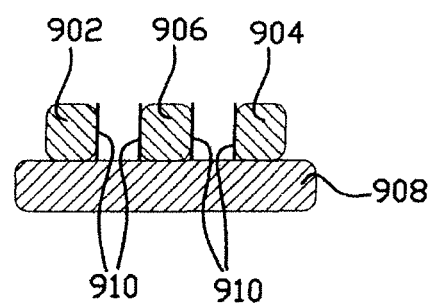

FIG. 16 schematically shows still another embodiment interleaved trace configuration where the interleaved traces include an odd number of traces (e.g., three, with two positive polarity write traces 902, 904 and one negative polarity write trace 906) on an insulative layer 908. Surface currents concentrated at inner surfaces 910 (e.g., four) of traces 902, 904, 906 act together in order to increase bandwidth and lower differential impedance of the array.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A disk drive head suspension, comprising:
   an integrated lead flexure including:
     a conductive spring metal base layer;
     an insulating layer over the base layer;
     a trace layer on the insulating layer, the trace layer including a first trace and a second trace; and
     an insulating cover coat layer on the trace layer over the first and second traces; and
     an isolated conductor layer on the cover coat layer, the isolated conductor layer being electrically isolated from the conductive base layer and electrically connecting the first and second traces; and
   a load beam mounted to the base layer of the flexure, wherein the load beam is electrically isolated from the isolated conductor layer by the insulating layer.

2. The disk drive head suspension of claim 1, wherein the cover coat has a pocket formed into the thickness of the cover coat, and further wherein the isolated conductor layer is disposed in the pocket.

3. The disk drive head suspension of claim 1, further comprising a plurality of interconnects formed through the cover coat extending from the first and second traces to the isolated conductor layer.

4. The disk drive suspension of claim 1 wherein the integrated lead flexure further includes a third trace between the first and second traces, and wherein the third trace is free from an electrical connection to the isolated conductor layer.

5. A disk drive head suspension of the type having a load beam and an integrated lead flexure mounted to the load beam, wherein the flexure includes a plurality of spaced-apart traces extending between terminal connector pads and head connector pads, a conductive base layer, an insulating layer over the base layer electrically insulating the base layer from the traces, a trace layer including first and second traces, an insulating cover coat layer on the trace layer over the first and second traces and an isolated conductor layer on the cover coat layer and electrically connecting the first and second traces, and wherein the load beam is under the base layer and is electrically isolated from the isolated conductor layer by the insulating layer.

6. The disk drive head suspension of claim 5, wherein the trace layer includes a third trace between the first and second traces, and wherein the third trace is free from electrical connection to the isolated conductor layer.

7. The disk drive head suspension of claim 5, further comprising a pocket formed into the thickness of the cover coat, wherein the isolated conductor layer is arranged in the pocket in the cover coat.

* * * * *